US012039906B2

(12) United States Patent
Kim

(10) Patent No.: US 12,039,906 B2
(45) Date of Patent: Jul. 16, 2024

(54) DATA DRIVER AND DISPLAY DEVICE INCLUDING THE SAME

(71) Applicant: LG Display Co., Ltd., Seoul (KR)

(72) Inventor: Hyun Chul Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/050,126

(22) Filed: Oct. 27, 2022

(65) Prior Publication Data

US 2023/0215317 A1 Jul. 6, 2023

(30) Foreign Application Priority Data

Dec. 31, 2021 (KR) ........................ 10-2021-0194513

(51) Int. Cl.
*G09G 3/20* (2006.01)

(52) U.S. Cl.
CPC ....... *G09G 3/20* (2013.01); *G09G 2310/0275* (2013.01); *G09G 2310/0297* (2013.01); *G09G 2310/08* (2013.01); *G09G 2320/041* (2013.01)

(58) Field of Classification Search
CPC ............. G09G 3/20; G09G 2310/0275; G09G 2310/0297; G09G 2310/08; G09G 2320/041; G09G 2320/043
See application file for complete search history.

(56) References Cited

U.S. PATENT DOCUMENTS 5,760,841 A * 6/1998 Kang ..................... H04N 9/641 348/663
2014/0062994 A1* 3/2014 Chen .................... G09G 3/3688 345/214
2014/0300654 A1* 10/2014 Kim ........................ G09G 5/008 345/99
2016/0125811 A1* 5/2016 Park ...................... G09G 3/3258 345/694
2016/0189581 A1* 6/2016 Hwang .................. G09G 3/006 345/691
2018/0190218 A1* 7/2018 Jang ...................... G09G 3/2096
2018/0261150 A1* 9/2018 Tamura ................ G09G 3/2074
2020/0160781 A1 5/2020 Park
2020/0202818 A1* 6/2020 Kuroiwa .............. G09G 3/2096
2021/0142702 A1* 5/2021 Lee ........................ G09G 3/006
2021/0201781 A1* 7/2021 Kim ...................... G09G 3/3233

FOREIGN PATENT DOCUMENTS

KR 10-2016-0082729 A 7/2016
KR 10-2021-0085066 A 7/2021

OTHER PUBLICATIONS

Extended European Search Report dated Jun. 1, 2023 issued in Patent Application No. 22203337.5 (15 pages).

* cited by examiner

*Primary Examiner* — Gerald Johnson
(74) *Attorney, Agent, or Firm* — POLSINELLI PC

(57) ABSTRACT

A display device includes a timing controller, a data driver controlled by the timing controller, and a display panel configured to display an image by the data driver. When a data signal is applied in an abnormal state, the data driver generates a voltage for display of black by itself, and supplies the voltage to the display panel.

19 Claims, 17 Drawing Sheets

DATA DRIVER AND DISPLAY DEVICE INCLUDING THE SAME

CROSS-REFERENCE TO RELATED APPLICATION

This application claims the priority of Korean Patent Application No. 10-2021-0194513 filed on Dec. 31, 2021, which is hereby incorporated by reference in its entirety.

BACKGROUND

Field of the Disclosure

The present disclosure relates to a data driver and a display device including the same.

Description of the Background

In accordance with development of information technology, the market for display devices as medium interconnecting users and information is expanding. As such, use of display devices such as a light emitting display (LED) device, a quantum dot display (QDD) device, a liquid crystal display (LCD) device and the like is increasing.

The above-mentioned display devices include a display panel including subpixels, a driver configured to output a drive signal for driving the display panel, and a power supply configured to generate electric power to be supplied to the display panel or the driver.

When drive signals, for example, scan signals and data signals, are supplied to subpixels formed at a display panel in a display device as mentioned above, selected ones of the subpixels transmit light or directly emit light and, as such, the display device may display an image.

However, the display panels can be situated under an abnormal operation state due to a problem caused by an increase in temperature in a display panel and a deterioration in driving stability.

SUMMARY

Accordingly, the present disclosure is directed to a data driver and a display device including the same that substantially obviate one or more problems due to limitations and disadvantages described above.

More specifically, the present disclosure is to provide a data driver and a display device including the same wherein, when the data driver is in an abnormal operation state, the data driver outputs a voltage for display of black by itself, thereby not only minimizing occurrence of an abnormal phenomenon at the display device, but also preventing a problem caused by an increase in temperature in a display panel and enhancing driving stability.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with the purpose of the disclosure, as embodied and broadly described herein, a display device includes a timing controller, a data driver controlled by the timing controller, and a display panel configured to display an image by the data driver, wherein, when a data signal is applied in an abnormal state, the data driver generates a voltage for display of black by itself, and supplies the voltage to the display panel.

The data driver may generate the voltage for display of black by itself, corresponding to a logic state of an internal lock signal.

The data driver may generate the voltage for display of black by itself when the internal lock signal transitions to logic low.

The data driver may include a multiplexer. The multiplexer may use a black voltage source as an output thereof, corresponding to the internal lock signal.

The data driver may include a latch configured to store a data signal transmitted from the timing controller. The latch may reset the data signal, corresponding to the internal lock signal, thereby outputting a data signal of 0.

The data driver may be recovered to output a data voltage after outputting the voltage for display of black during a period in which a gate start pulse for control of start of a scan signal is generated at least two times.

In another aspect of the present disclosure, there is provided a data driver including a recovery circuit configured to recover a signal including a clock signal and a data signal from a data packet input through an input terminal and to output an internal lock signal in accordance with a state of the data packet, and a data converter configured to generate a voltage for display of black by itself, corresponding to a logic state of the internal lock signal output from the recovery circuit and to output the voltage for display of black.

The data converter may include a multiplexer. The multiplexer may use a black voltage source as an output thereof, corresponding to the internal lock signal.

The data converter may include a latch configured to store a data signal. The latch may reset the data signal, corresponding to the internal lock signal, thereby outputting a data signal of 0.

The data converter may generate the voltage for display of black by itself when the internal lock signal transitions to logic low.

In accordance with the exemplary aspects of the present disclosure, there is an effect of enabling the data driver to vary driving conditions when the data driver is in an abnormal operation state, in order to output a voltage for display of black by itself, thereby minimizing occurrence of an abnormal phenomenon at the display panel. In addition, in accordance with the exemplary aspects of the present disclosure, since the data driver outputs a voltage for display of black by itself, when the data driver is in an abnormal operation state, it may be possible to not only prevent a problem caused by an increase in temperature in the display panel, but also to enhance driving stability.

BRIEF DESCRIPTION OF THE DRAWINGS

The accompanying drawings, which are included to provide a further understanding of the disclosure and are incorporated in and constitute a part of this application, illustrate aspect(s) of the disclosure and along with the description serve to explain the principle of the disclosure.

In the drawings.

DETAILED DESCRIPTION

A display device according to an exemplary aspect of the present disclosure may be implemented as a television, an image player, a personal computer (PC), a home theater, an automobile electric device, a smartphone, etc., without being limited thereto. The display device according to the exemplary aspect of the present disclosure may be implemented as a light emitting display (LED) device, a quantum dot display (QDD) device, a liquid crystal display (LCD) device, etc. However, the following description will be given in conjunction with, for example, a light emitting display device configured to directly emit light based on an inorganic light emitting diode or an organic light emitting diode, for convenience of description.

Figure 1:
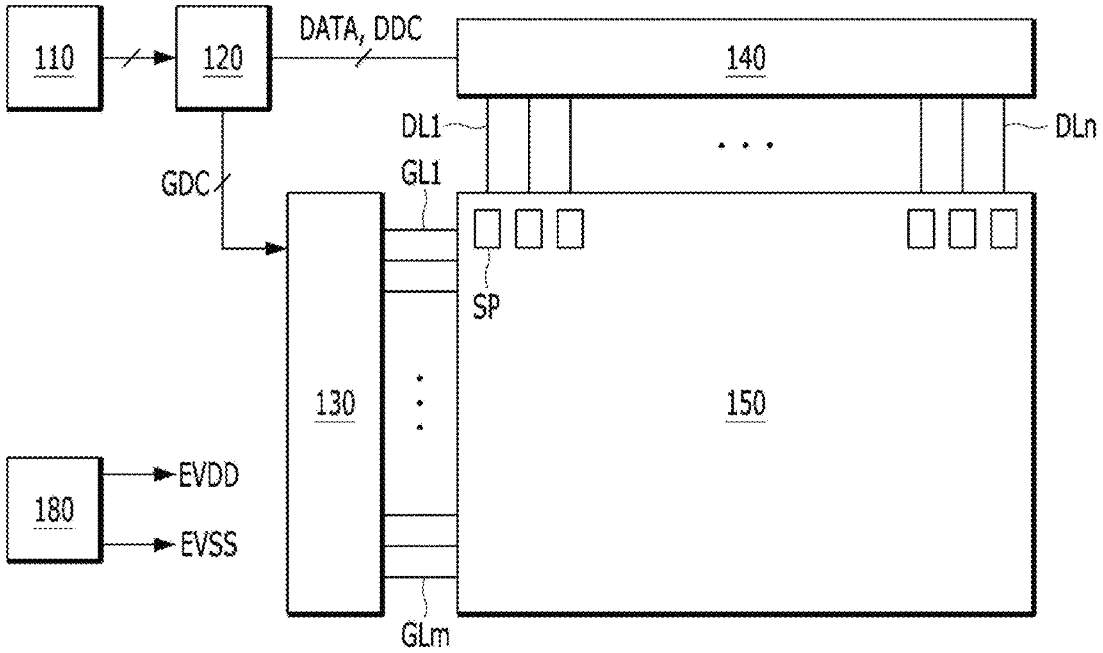
FIG. 1 is a block diagram schematically showing a light emitting display device.
Figure 2:
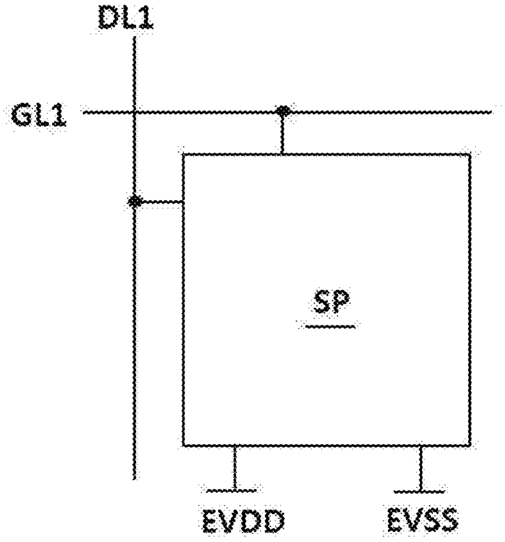
FIG. 2 is a diagram schematically showing a subpixel shown in FIG. 1.

FIG. 1 is a block diagram schematically showing a light emitting display device. FIG. 2 is a diagram schematically showing a subpixel shown in FIG. 1.

As shown in FIGS. 1 and 2, the light emitting display device may include an image supplier 110, a timing controller 120, a scan driver 130, a data driver 140, a display panel 150, a power supply 180, etc.

The image supplier 110 (a set or a host system) may output various driving signals together with an image data signal supplied from an exterior thereof or an image data signal stored in an internal memory thereof. The image supplier 110 may supply a data signal and various driving signals to the timing controller 120.

The timing controller 120 may output a gate timing control signal GDC for control of an operation timing of the scan driver 130, a data timing control signal DDC for control of an operation timing of the data driver 140, various synchronization signals (a vertical synchronization signal Vsync and a horizontal synchronization signal Hsync), etc. The timing controller 120 may supply, to the data driver 140, a data signal DATA supplied from the image supplier 110 together with the data timing signal DDC. The timing controller 120 may take the form of an integrated circuit (IC) and, as such, may be mounted on a printed circuit board, without being limited thereto.

The scan driver 130 may output a scan signal (or a scan voltage) in response to the gate timing control signal GDC supplied from the timing controller 120. The scan driver 130 may supply a scan signal to the subpixels included in the display panel 150 through gate lines GL1 to GLm. The scan driver 130 may take the form of an IC or may be directly formed on the display panel 150 in a gate-in-panel manner, without being limited thereto.

The data driver 140 may sample and latch a data signal DATA in response to the data timing control signal DDC supplied from the timing controller 120, may convert the resultant data signal, which has a digital form, into a data voltage having an analog form, based on a gamma reference voltage, and may output the data voltage. The data driver 140 may supply the data voltage to the subpixels included in the display panel 150 through data lines DL1 to DLn. The data driver 140 may take the form of an IC and, as such, may be mounted on the display panel 150 or may be mounted on a printed circuit board, without being limited thereto.

The power supply 180 may generate first power of a high voltage level and a second power of a low voltage level based on an external input voltage supplied from an exterior thereof, and may output the first power and the second power through a first power line EVDD and a second power line EVSS. The power supply 180 may generate and output not only the first power and the second power, but also a voltage (for example, a gate voltage including a gate-high voltage and a gate-low voltage) required for driving of the scan driver 130, a voltage (a drain voltage and a drain voltage including a half drain voltage) required for driving of the data driver 140, etc.

The display panel 150 may display an image, corresponding to the driving signal including the scan signal and the data voltage, the first power, the second power, etc. The subpixels of the display panel 150 may directly emit light. The display panel 150 may be fabricated based on a substrate having stiffness or ductility, such as glass, silicon, polyimide or the like. The subpixels, which emit light, may be constituted by red, green and blue subpixels or red, green, blue and white subpixels.

For example, one subpixel SP may include a pixel circuit connected to a first data line DL1, a first gate line GL1, a first power line EVDD and a second power line EVSS while including a switching transistor, a driving transistor, a capacitor, an organic light emitting diode, etc. The subpixel SP, which is used in the light emitting display device, has a complex circuit configuration because the subpixel SP directly emits light. Furthermore, a compensation circuit configured to compensate for degradation of not only the organic light emitting diode, which emits light, but also the driving transistor configured to supply, to the organic light emitting diode, driving current required for driving of the organic light emitting diode, etc. is also diverse. For convenience of illustration, however, the subpixel SP is simply shown in the form of a block.

Meanwhile, in the above description, the timing controller 120, the scan driver 130, the data driver 140, etc. have been described as having individual configurations, respectively. However, one or more of the timing controller 120, the scan driver 130 and the data driver 140 may be integrated into one IC in accordance with an implementation type of the light emitting display device.

Figure 3:
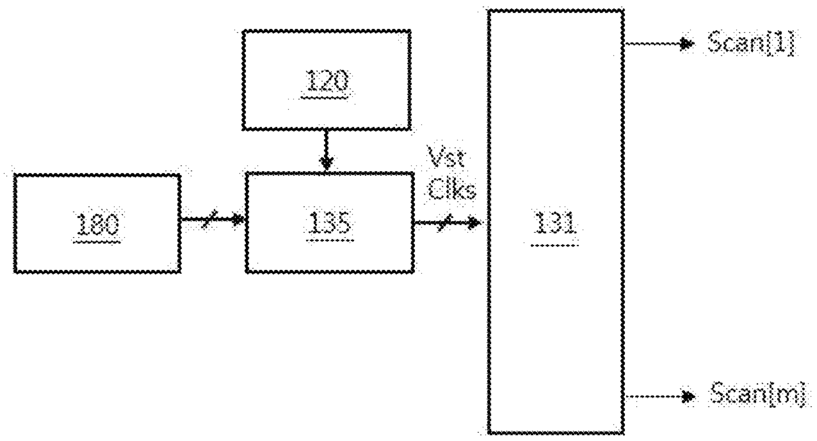
FIGS. 3 and 4 are views explaining a configuration of a gate-in-panel type scan driver.
Figure 4:
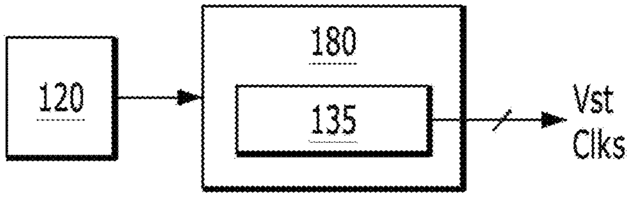
Figure 5A:
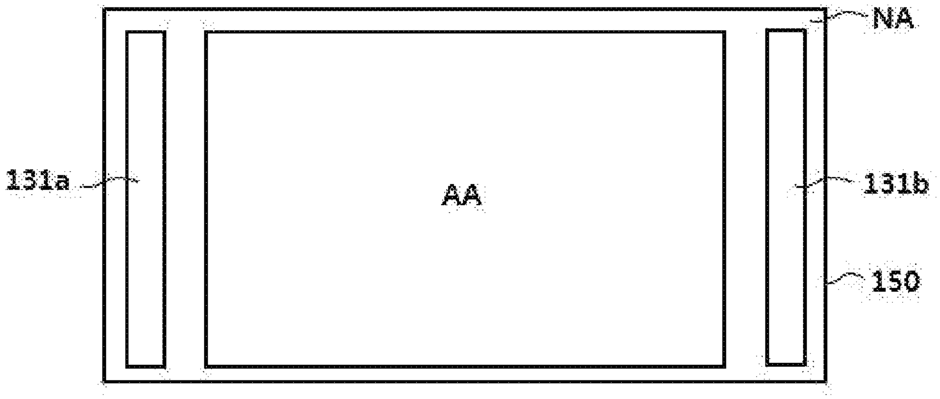
FIGS. 5A and 5B are views showing disposition examples of a gate-in-panel type scan driver.
Figure 5B:
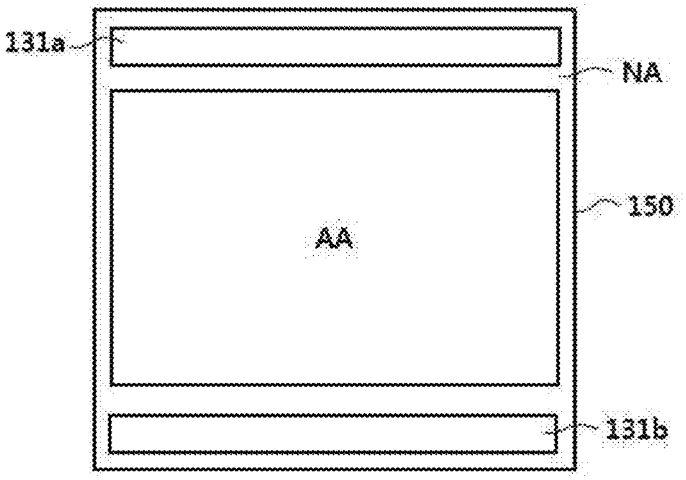

FIGS. 3 and 4 are views explaining a configuration of a gate-in-panel type scan driver. FIGS. 5A and 5B are views showing disposition examples of a gate-in-panel type scan driver.

As shown in FIG. 3, the gate-in-panel type scan driver, which is designated by reference numeral "130", may include a shift register 131 and a level shifter 135. The level shifter 135 may generate scan clock signals Clks, a start signal Vst, etc. based on signals and voltages output from a timing controller 120 and a power supply 180. The scan clock signals Clks may be generated under the condition that the scan clock signals Clks have J different phases (J being an integer of 2 or greater), such as 2-phase, 4-phase, 8-phase, etc.

The shift register 131 may operate based on the signals Clks and Vst, etc. output from the level shifter 135, and may output scan signals Scan[1] to Scan[m] capable of turning on or off transistors formed at a display panel. The shift register 131 may be formed on the display panel in a gate-in-panel manner in the form of a thin film.

As shown in FIGS. 3 and 4, the level shifter 135 may be independently formed in the form of an IC or may be internally included in the power supply 180, differently from the shift register 131. However, this configuration is only illustrative, and the exemplary aspects of the present disclosure are not limited thereto.

As shown in FIGS. 5A and 5B, shift registers 131*a* and 131*b*, which output scan signals in a gate-in-panel type scan driver, may be disposed in a non-display area NA of a display panel 150. The shift registers 131*a* and 131*b* may be disposed in left and right non-display areas NA of the display panel 150, as shown in FIG. 5A, or may be disposed in upper and lower non-display areas NA of the display panel 150, as shown in FIG. 5B. Meanwhile, although the shift registers 131*a* and 131*b* have been shown and described with reference to FIGS. 5A and 5B in conjunction with an example in which the shift registers 131*a* and 131*b* are disposed in the non-display area NA, the exemplary aspects of the present disclosure are not limited thereto.

Figure 6:
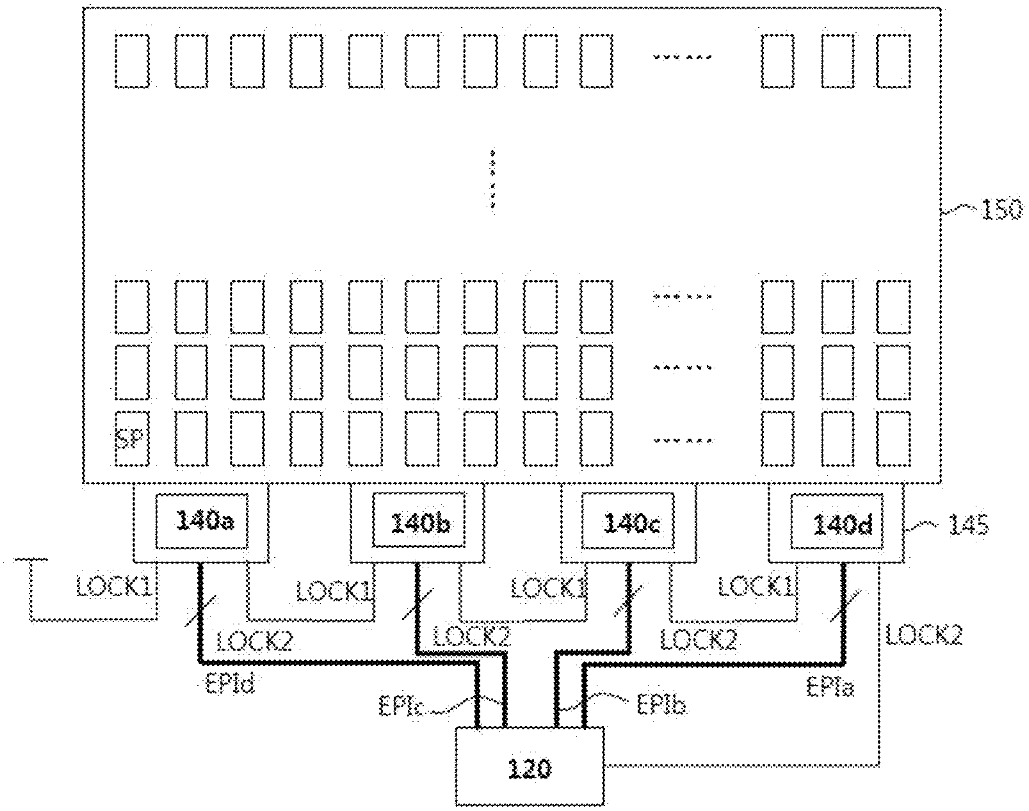
FIG. 6 is a diagram showing a light emitting display device according to a first aspect of the present disclosure.
Figure 7:
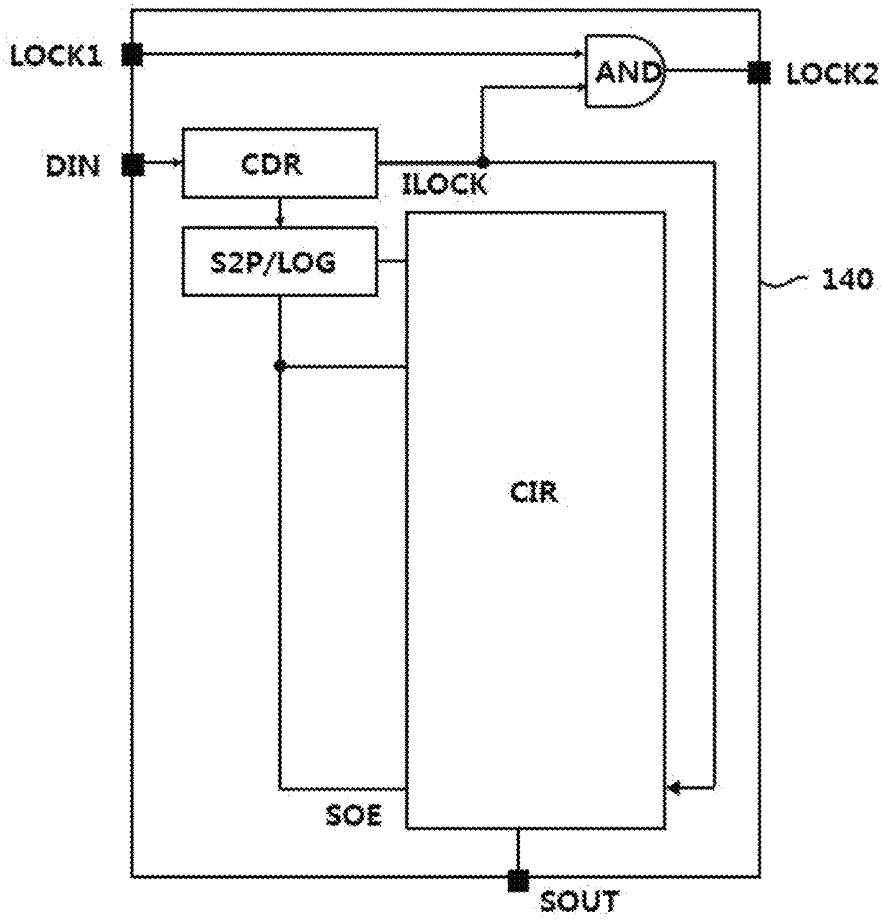
FIG. 7 is a diagram showing a data driver according to the first aspect of the present disclosure.
Figure 8:
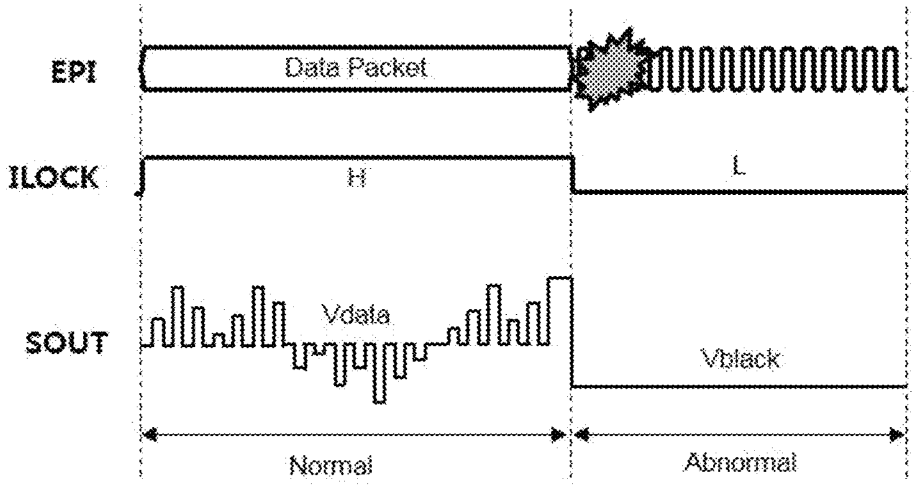
FIG. 8 is a diagram explaining functionality of the data driver according to the first aspect of the present disclosure.
Figure 9:
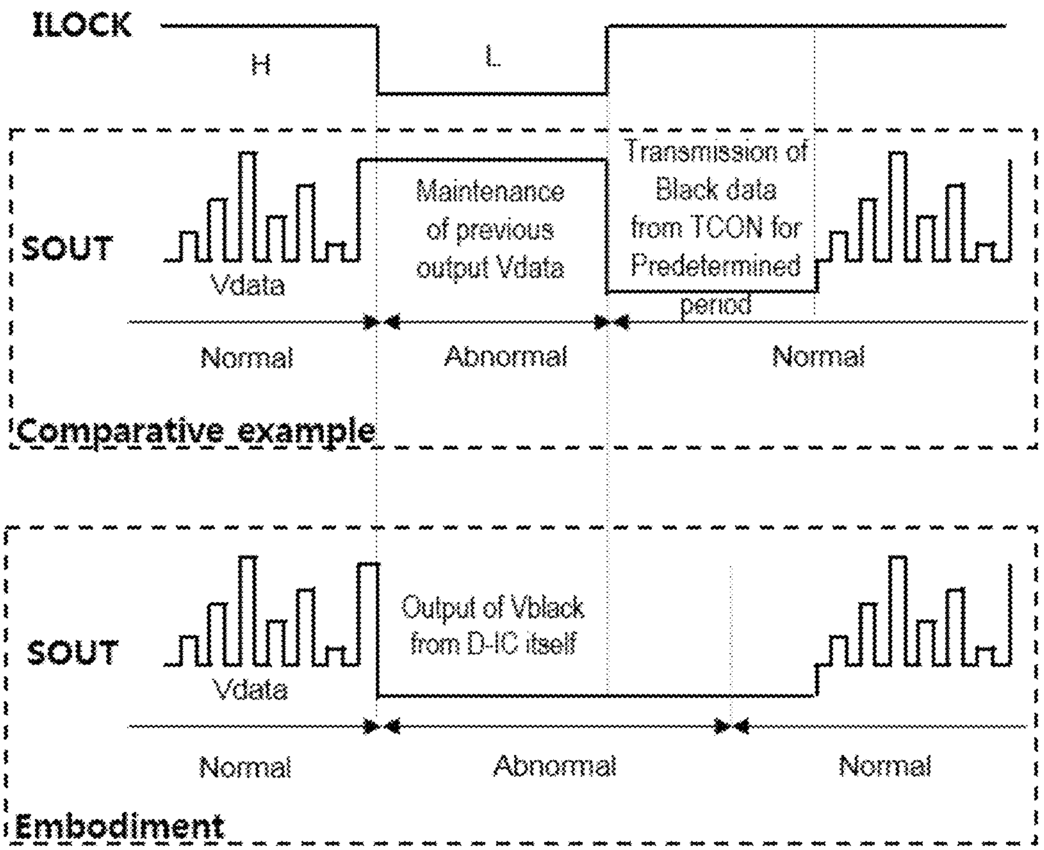
FIG. 9 is a diagram explaining advantages of the data driver according to the first aspect of the present disclosure, as compared to a comparative example.

FIG. 6 is a diagram showing a light emitting display device according to a first aspect of the present disclosure. FIG. 7 is a diagram showing a data driver according to the first aspect of the present disclosure. FIG. 8 is a diagram explaining functionality of the data driver according to the first aspect of the present disclosure. FIG. 9 is a diagram explaining advantages of the data driver according to the first aspect of the present disclosure, as compared to a comparative example.

As shown in FIG. 6, the light emitting display device according to the first aspect of the present disclosure may include a display panel 150, a plurality of data drivers 140*a* to 140*d*, and a timing controller 120. The plurality of data drivers 140*a* to 140*d* may be mounted on a plurality of flexible substrates 145, respectively.

The plurality of data drivers 140*a* to 140*d* may have communication interfaces EPIa to EPId, respectively, and may receive signals including a clock signal, a data signal, etc. output from the timing controller 120 in the form of a data packet via the communication interfaces EPIa to EPId. The communication interfaces EPIa to EPId will be shown and described in conjunction with, for example, an embedded clock point-to-point interface (EPI) based on an embedded clock scheme.

The plurality of data drivers 140*a* to 140*d* may each include a first lock signal terminal LOCK1 and a second lock signal terminal LOCK2 in order to transmit and receive lock signals informing of states thereof. For example, the first data driver 140*a* may receive a signal from an exterior thereof through the first lock signal terminal LOCK1 thereof, may generate a lock signal informing of a state thereof, together with a signal generated therein, and may output the generated lock signal through the second lock signal terminal LOCK2 thereof.

The second data driver 140*b* may receive the lock signal output from the first data driver 140*a* through the first lock signal terminal LOCK1 thereof, may generate a lock signal informing of a state thereof, together with a signal generated therein, and may output the generated lock signal through the second lock signal terminal LOCK2 thereof.

In such a manner, the lock signal of the second data driver 140*b* may be transmitted to the third data driver 140*c*, and a lock signal of the third data driver 140*c* may be applied to the fourth data driver 140*d*. The fourth data driver 140*d*, which is disposed at a most downstream position among the plurality of data drivers 140*a* to 140*d*, may apply, to the timing controller 120, a lock signal output through the second lock signal terminal LOCK2 thereof.

The timing controller 120 may check states of the plurality of data drivers 140*a* to 140*d*, based on the lock signal received from the fourth data driver 140*d*, and may output a data signal, etc. via the communication interfaces EPIa to EPId coupled to the plurality of data drivers 140*a* to 140*d*.

As shown in FIG. 7, the data driver 140 according to the first aspect of the present disclosure may include a recovery circuit CDR, a data controller S2P/LOG, a data converter CIR, and an AND gate AND.

The recovery circuit CDR may function to recover a clock signal, a data signal, etc. from a data packet input thereto through an input terminal DIN. The recovery circuit CDR may output an internal lock signal ILOCK according to a state of the clock signal or the data signal included in the data packet.

The data controller S2P/LOG may function to receive the clock signal, the data signal, etc. from the recovery circuit CDR, to transition the data signal, which is input in a serial form, into a parallel form, and to output the resultant data signal. In addition, the data controller S2P/LOG may not only control a device internally included in the data driver 140, but also may function to generate a source output signal SOE, etc. for control of an output timing of the data converter CIR.

The data converter CIR may function to convert a data signal having a digital form received from the data controller S2P/LOG into a data voltage having an analog form, and to output the data voltage. The data converter CIR may output the data voltage through an output terminal SOUT, in response to the source output signal SOE output from the data controller S2P/LOG.

The AND gate AND may function to AND a signal applied thereto through a first lock signal terminal LOCK1 and the internal lock signal ILOCK output from the recovery circuit CDR. The AND gate AND may generate a lock signal, based on the signals applied thereto through two input terminals thereof, and may output the generated lock signal through a second lock signal terminal LOCK2.

As shown in FIGS. 7 and 8, the data driver 140 according to the first aspect of the present disclosure may receive a data packet from the timing controller 120 via an EPI interface EPI coupled to an input terminal DIN thereof.

When the data packet output from the timing controller 120 is applied to the data driver 140 in a normal state, the recovery circuit CDR may output an internal lock signal ILOCK of logic high H. In this case, the data converter CIR may convert a data signal of various grayscales into a data voltage Vdata, corresponding to a normal operation of the data driver 140, and may output the data voltage Vdata through an output terminal SOUT.

On the other hand, when the data packet output from the timing controller 120 is applied to the data driver 140 in an abnormal state, the recovery circuit CDR may output an internal lock signal ILOCK of logic low L. The recovery circuit CDR may also generate a black-level voltage Vblack by itself, corresponding to the internal lock signal ILOCK, and may output the black-level voltage Vblack through the output terminal SOUT.

In addition, the recovery circuit CDR may also output the internal lock signal ILOCK of logic low L when the timing controller 120 is in an abnormal state or when the interface coupled between the timing controller 120 and the data driver 140 is in an abnormal state.

That is, when a device environment is in an abnormal state, the data driver 140 according to the first aspect of the present disclosure may generate a black-level voltage (a low voltage) by itself, corresponding to a logic state of the internal lock signal ILOCK, and may output the black-level voltage (lock fail black driving). Meanwhile, the data driver 140 may be recovered to output a data voltage after outputting the black-level voltage during a period in which a gate start pulse for control of start of a scan signal is generated at least two times. However, when the abnormal state is still maintained in spite of the recovery, driving conditions may be varied such that the data driver 140 again outputs the black-level voltage.

A data driver according to the comparative example shown in FIG. 9 maintains a previously-output data voltage Vdata for a predetermined period when an abnormal state has been generated. The data driver according to the comparative example may then generate a black-level voltage, based on black data transmitted from a timing controller TCON for a predetermined period, and may then output the black-level voltage through an output terminal SOUT.

A data driver D-IC according to the aspect shown in FIG. 9 may generate a black-level voltage Vblack by itself when an abnormal state has been generated, and may then output the black-level voltage Vblack through an output terminal SOUT. The data driver D-IC according to the aspect may omit a procedure of receiving a black data signal Black data from the timing controller TCON because the data driver D-IC may output the black-level voltage Vblack by itself.

Advantages of the aspect compared with the comparative example will be described hereinafter. The data driver according to the aspect may output the black voltage Vblack by itself without maintaining a previously-output data voltage Vdata for a predetermined period, even though an abnormal state has been generated. That is, the data driver according to the aspect does not maintain the previously-output data voltage Vdata and, as such, it may be possible to prevent a problem of display of an abnormal image on a display panel. In addition, the data driver according to the aspect may control the display panel to be in a black state, without assistance of the timing controller TCON, even though an abnormal state has been generated. That is, in accordance with the data driver according to the aspect, an abnormal image is not displayed, even when a problem associated with the interface coupled to the timing controller TCON is continued for a predetermined time or longer. Accordingly, occurrence of an abnormal phenomenon at the display panel may be minimized.

Figure 10:
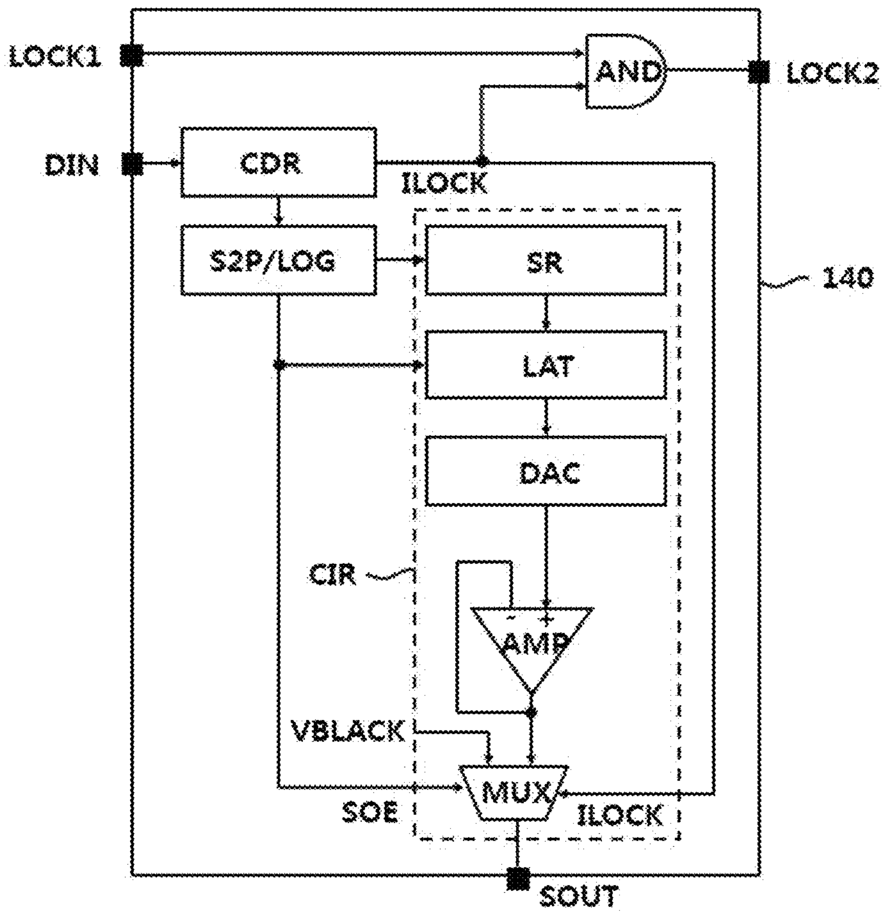
FIG. 10 is a diagram showing a data driver according to a second aspect of the present disclosure.
Figure 11:
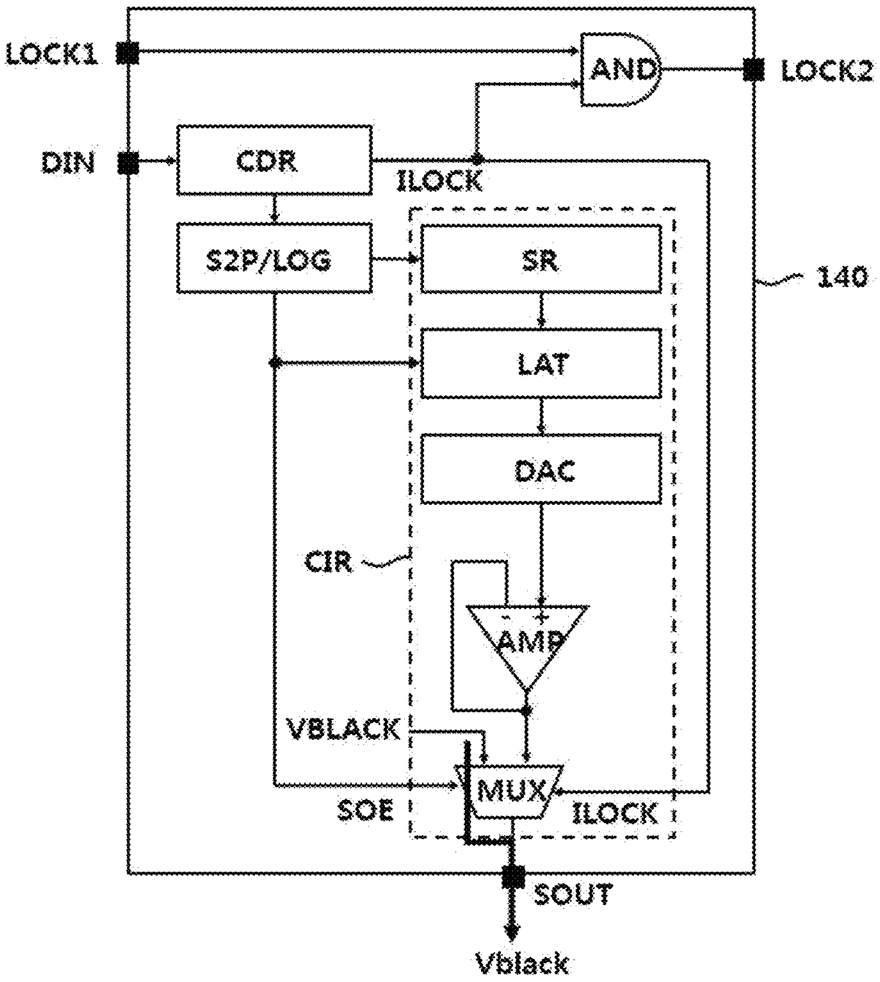
FIG. 11 is a diagram explaining operation of the data driver according to the second aspect of the present disclosure.

FIG. 10 is a diagram showing a data driver according to a second aspect of the present disclosure. FIG. 11 is a diagram explaining operation of the data driver according to the second aspect of the present disclosure.

As shown in FIGS. 10 and 11, the data driver, which is designated by reference numeral "140", has a difference from that of the first aspect in terms of a configuration included in a data converter CIR and operation thereof and, as such, will be described mainly in conjunction with such difference.

The data converter CIR may include a shift register SR, a latch LAT, a digital-to-analog converter DAC (hereinafter referred to as a "DA converter DAC"), an amplifier AMP, a multiplexer MUX, etc.

The shift register SR, the latch LAT and the DA converter DAC may perform an operation of sampling a digital data signal having a parallel form, storing the sampled data signal, and then converting the resultant data signal, which has a digital form, into a data voltage having an analog form. Although only one latch LAT is shown in FIG. 10, two latches may be configured.

The amplifier AMP may amplify the data voltage output from the DA converter DAC, and may output the amplified data voltage to a first input terminal of the multiplexer MUX. The multiplexer MUX may be connected, at the first input terminal thereof, to an output terminal of the amplifier AMP while being connected, at a second input terminal thereof, to a black-level voltage source VBLACK. Here, the black-level voltage source VBLACK is an internal voltage source used for driving of a device internally included in the data driver 140, and may be a circuit configured to generate and output a ground voltage GND or a voltage of 0 V approximate to the ground voltage GND.

The multiplexer MUX may output a data voltage in response to a source output signal SOE, or may output a black-level voltage Vblack, in place of the data voltage, in response to an internal lock signal ILOCK. The multiplexer MUX may be included in an output stage of the data driver 140.

Hereinafter, states associated with operation of the data driver 140 according to the internal lock signal ILOCK are shown in the following Table 1.

TABLE 1

| ILOCK | Data of LAT | SOUT | Remarks |
|---|---|---|---|
| L | Input data | Non-use of AMP (output of black level voltage) | Output of black-level voltage when ILOCK = L |
| H | Input data | Use of AMP (output of data voltage) | Output of data voltage |

Referring to TABLE 1, the data driver 140 according to the second aspect of the present disclosure may be controlled to output the black-level voltage Vblack, using the multiplexer MUX connected to the black voltage source VBLACK (using the black voltage source as an output), when the internal lock signal ILOCK informing of an abnormal state is generated.

Figure 12:
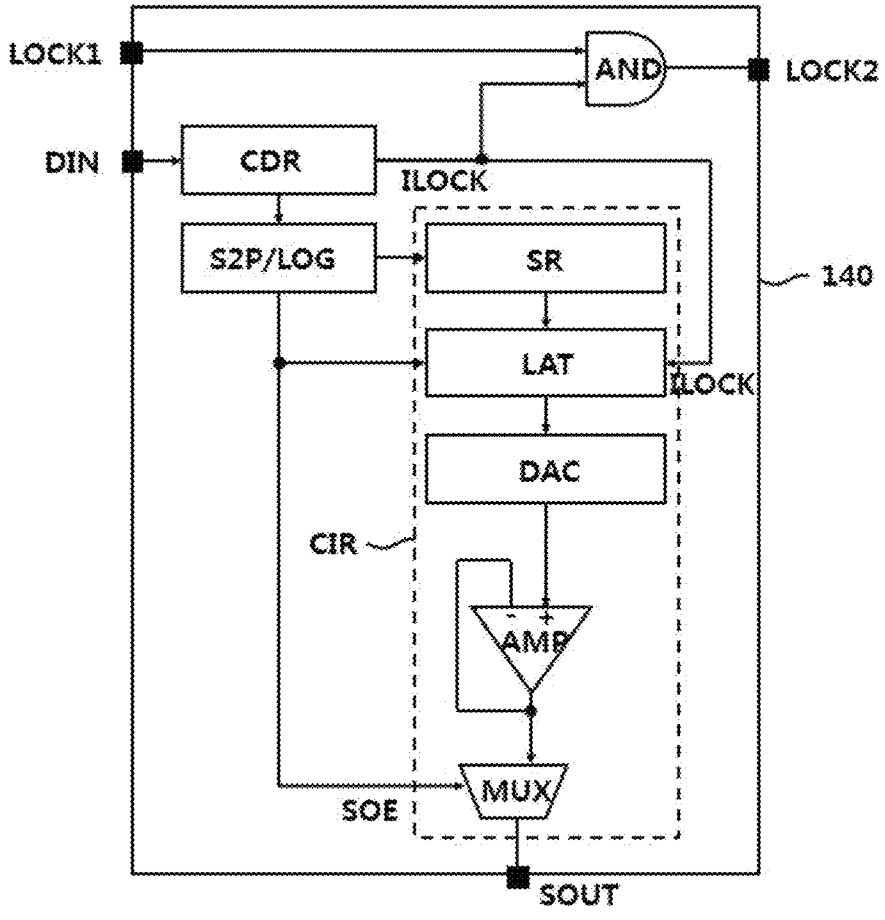
FIG. 12 is a diagram showing a data driver according to a third aspect of the present disclosure.
Figure 13:
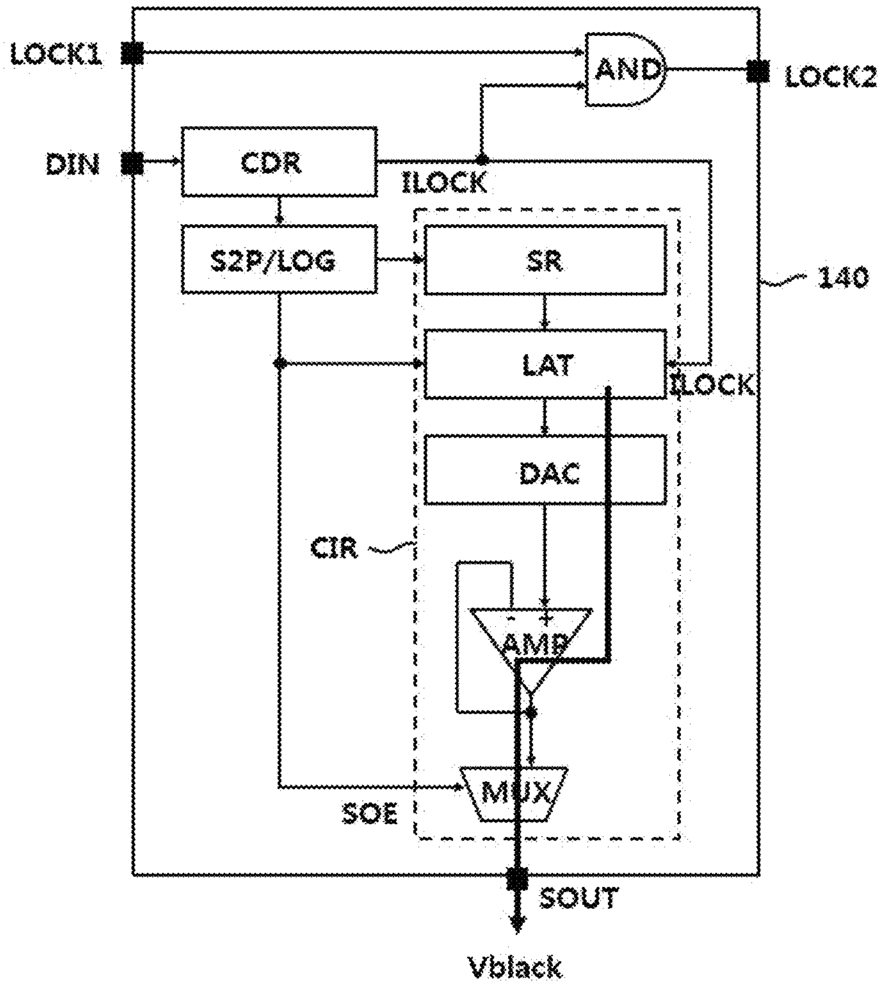
FIG. 13 is a diagram explaining operation of the data driver according to the third aspect of the present disclosure.

FIG. 12 is a diagram showing a data driver according to a third aspect of the present disclosure. FIG. 13 is a diagram explaining operation of the data driver according to the third aspect of the present disclosure.

As shown in FIGS. 12 and 13, the data driver has a difference from that of the first aspect in terms of a configuration included in a data converter CIR and operation thereof and, as such, will be described mainly in conjunction with such difference.

The data converter CIR may include a shift register SR, a latch LAT, a DA converter DAC, an amplifier AMP, a multiplexer MUX, etc.

The shift register SR, the latch LAT and the DA converter DAC may perform an operation of sampling a digital data signal having a parallel form, storing the sampled data signal, and then converting the resultant data signal, which has a digital form, into a data voltage having an analog form. The amplifier AMP may amplify the data voltage output from the DA converter DAC, and may output the amplified data voltage to an input terminal of the multiplexer MUX.

Meanwhile, the latch LAT may output the stored data signal in response to a source output signal SOE, or may reset the stored data signal to 0 in response to an internal lock signal ILOCK and may then output the reset data signal. When the reset data signal is output from the latch LAT, the DA converter DAC may output a low voltage corresponding to “0” (=a grayscale voltage GO), that is, a data voltage corresponding to black.

Hereinafter, states associated with operation of the data driver 140 according to the internal lock signal ILOCK are shown in the following Table 2.

TABLE 2

| ILOCK | Data of LAT | SOUT | Remarks |
|---|---|---|---|
| L | Black data corresponding to input data = 0 | Use of AMP (output of low data voltage corresponding to GO) | Conversion of data voltage into 0 through resetting of LAT when ILOCK = L |
| H | Input data | Use of AMP (output of data voltage) | Output of data voltage |

Referring to TABLE 2, the data driver 140 according to the third aspect of the present disclosure may be controlled to reset the data signal stored in the LAT to 0, for output of a data voltage corresponding to black, when the internal lock signal ILOCK informing of an abnormal state is generated.

Figure 14:
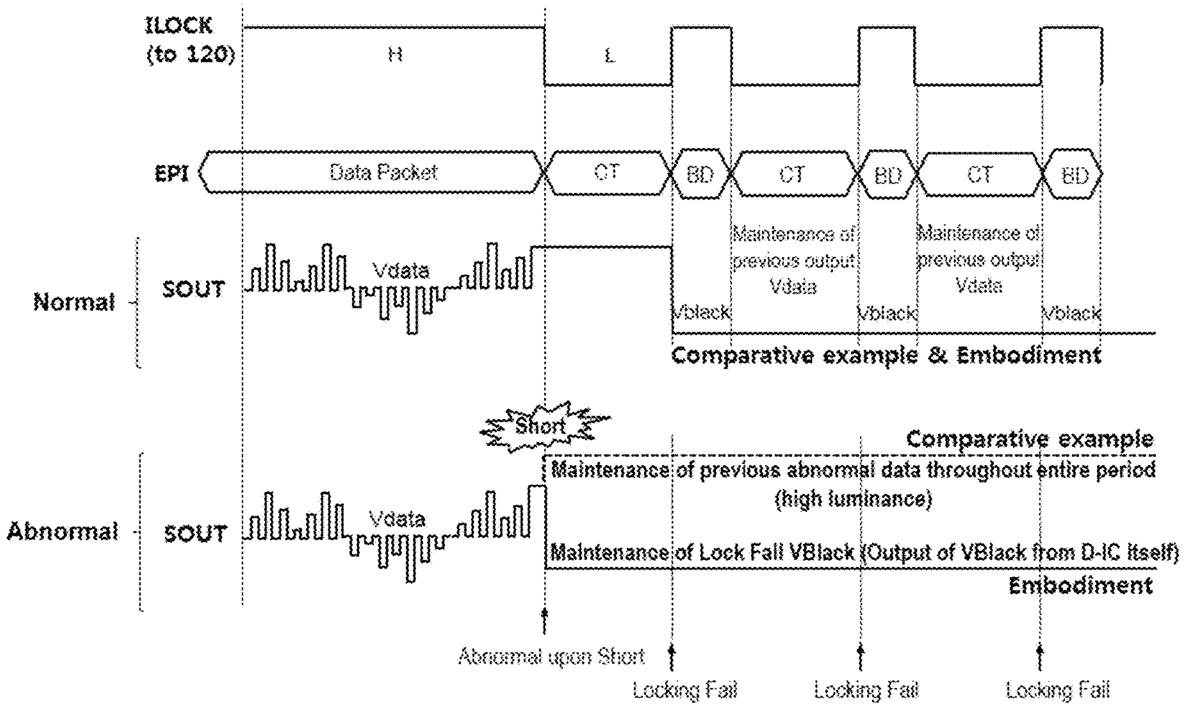
FIG. 14 is a diagram explaining operation states of timing controllers and data drivers according to a comparative example and an aspect of the present disclosure when short is generated.
Figure 15:
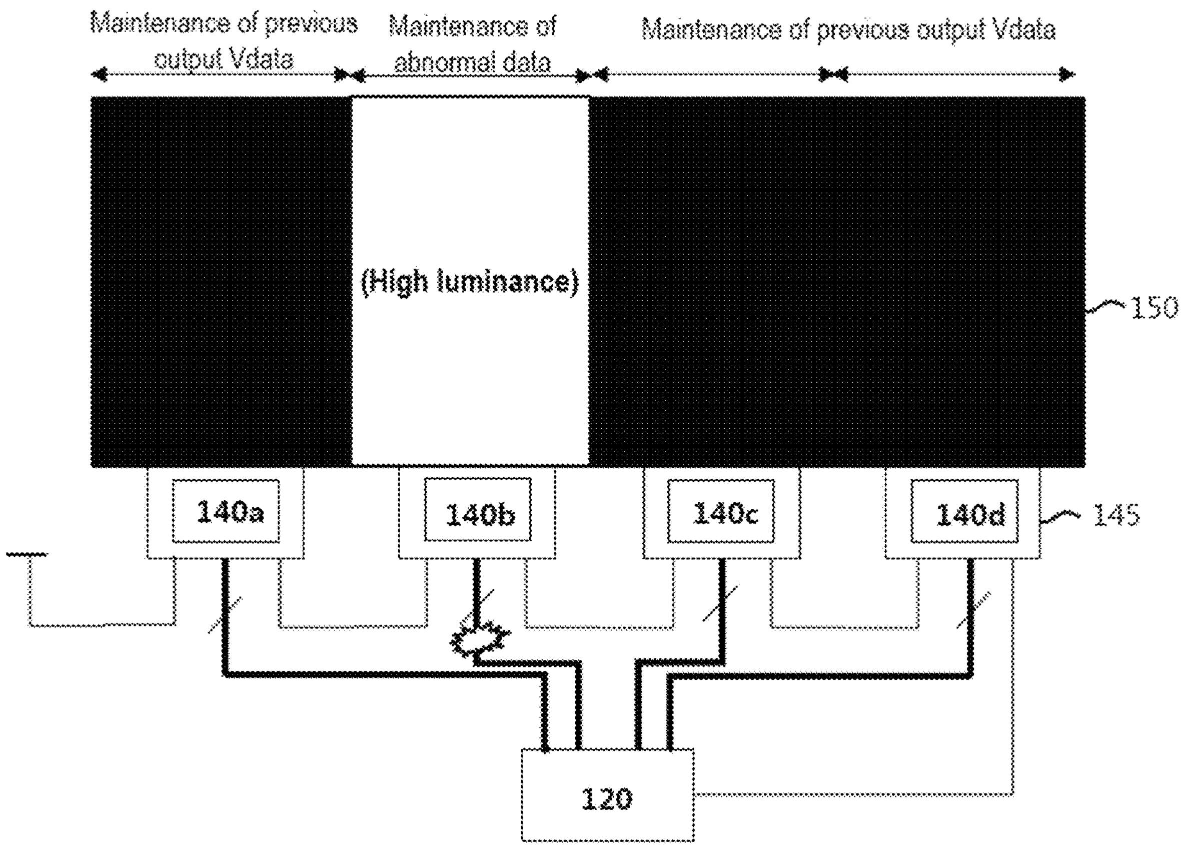
FIGS. 15 and 16 are diagrams showing states of display panels, for better understanding of FIG. 14.
Figure 16:
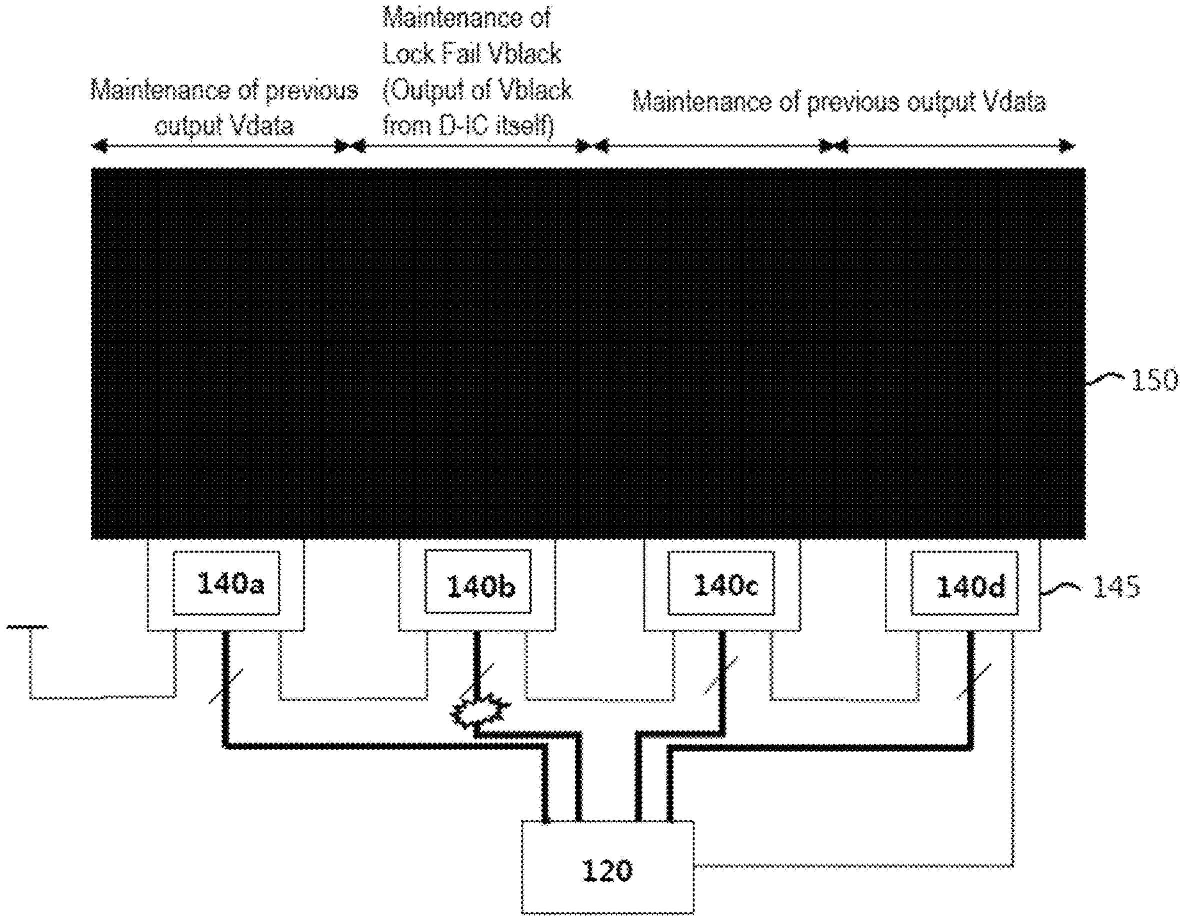

FIG. 14 is a diagram explaining operation states of timing controllers and data drivers according to a comparative example and an aspect of the present disclosure when short is generated. FIGS. 15 and 16 are diagrams showing states of display panels, for better understanding of FIG. 14.

Referring to a normal operation state Normal shown in FIG. 14, in each of the comparative example and the aspect, the timing controller thereof may transmit a data packet, and the data driver thereof may output a data voltage Vdata. In this case, the timing controller and the data driver in each of the comparative example and the aspect are in a stable state and, as such, the data driver may be in a state in which an internal lock signal ILOCK of logic high H is generated in the data driver.

When the timing controller and the data driver in each of the comparative example and the aspect operate normally, the timing controller and the data driver may perform an operation for configuring a normal interface along flow of clock training CT, a black data signal BD, clock training CT and a black data signal BD. In this case, the timing controller and the data driver in each of the comparative example and the aspect are in an unstable state and, as such, the data driver may be in a state in which an internal lock signal ILOCK of logic high H and logic low (L) is generated in the data driver.

Referring to an abnormal operation state Abnormal shown in FIG. 14, the data driver of the comparative example may output an abnormal data voltage Abnormal Data throughout the entire period. Accordingly, when short is generated on an interface of a second data driver 140*b* and a timing controller 120 in the comparative example, as shown in FIG. 15, the second data driver 140*b* of the comparative example may output an abnormal data voltage Abnormal Data. As a result, the comparative example may display an abnormal image on a display panel controlled by the second data driver 140*b*, differently from first, third and fourth data drivers 140*a*, 140*c* and 140*d*.

Referring to the abnormal operation state Abnormal shown in FIG. 14, the data driver of the aspect may recognize lock signal failure Lock Fail according to generation of an internal lock signal ILOCK of logic low L, and may then output a black-level voltage Vblack (or a data voltage corresponding to 0) by itself. Accordingly, when short is generated on an interface of a second data driver 140*b* and a timing controller 120 in the aspect, as shown in FIG. 16, the second data driver 140*b* of the aspect may output the black-level voltage Vblack (or the data voltage corresponding to 0) by itself. As a result, the aspect may also display a black image on a display panel controlled by the second data driver 140*b*, identically to first, third and fourth data drivers 140*a*, 140*c* and 140*d*.

Figure 17:
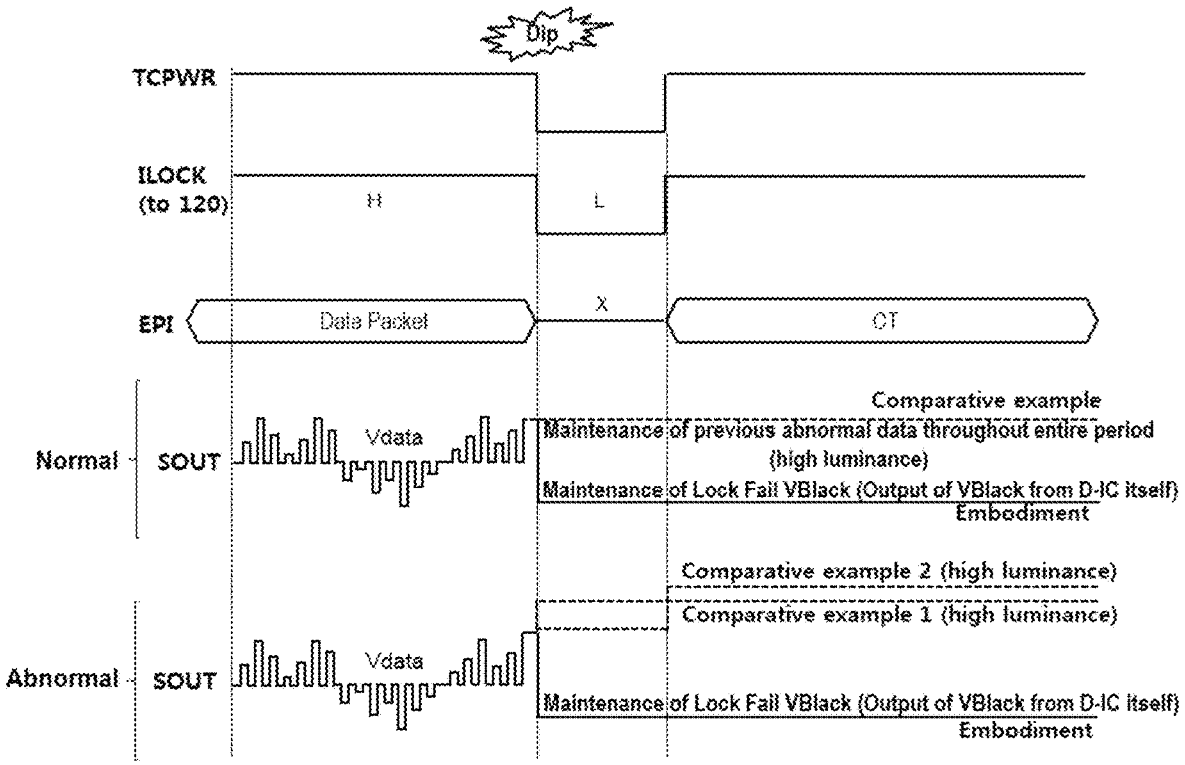
FIG. 17 is a diagram explaining operation states of the timing controllers and the data drivers according to the comparative example and the aspect of the present disclosure when abnormality of power is generated.
Figure 18:
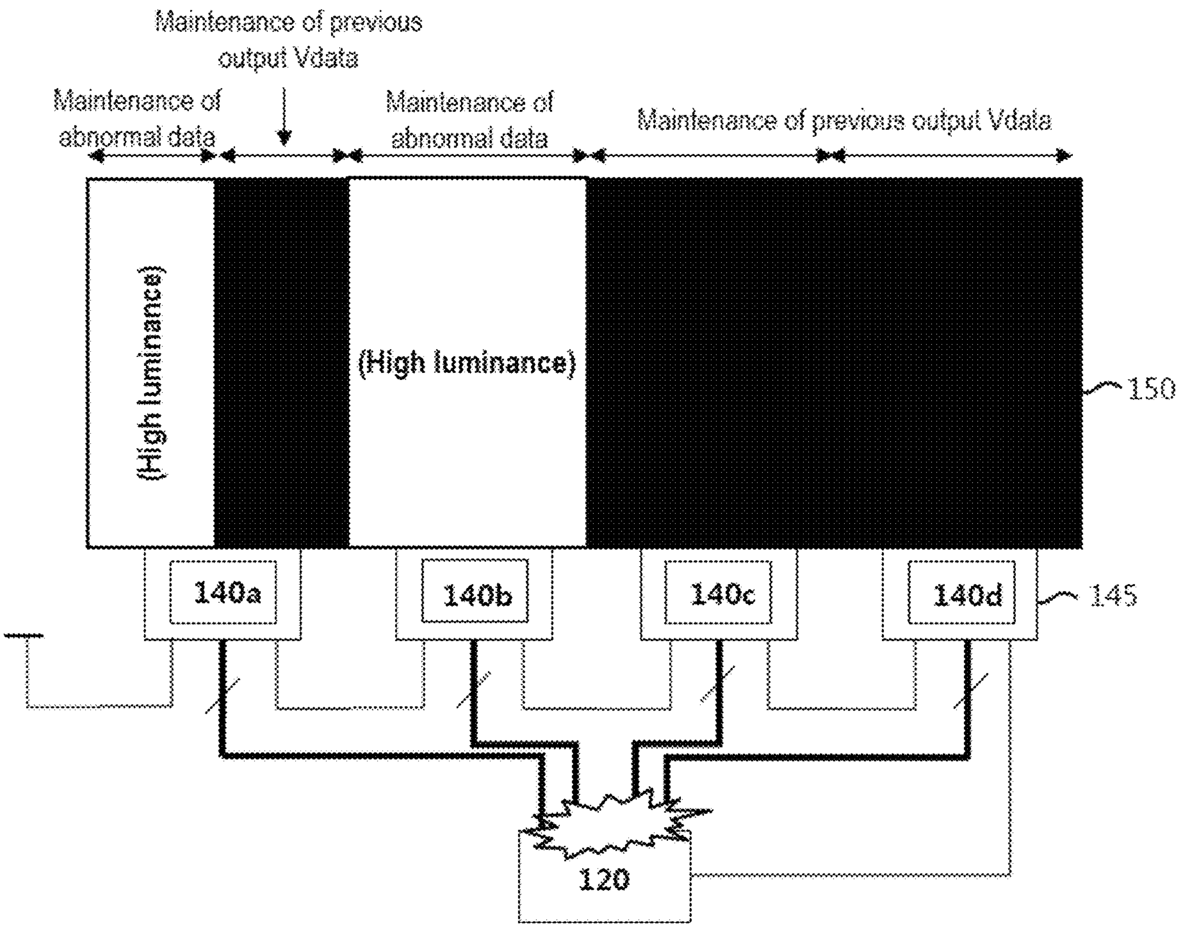
FIGS. 18 and 19 are diagrams showing states of display panels, for better understanding of FIG. 17.
Figure 19:
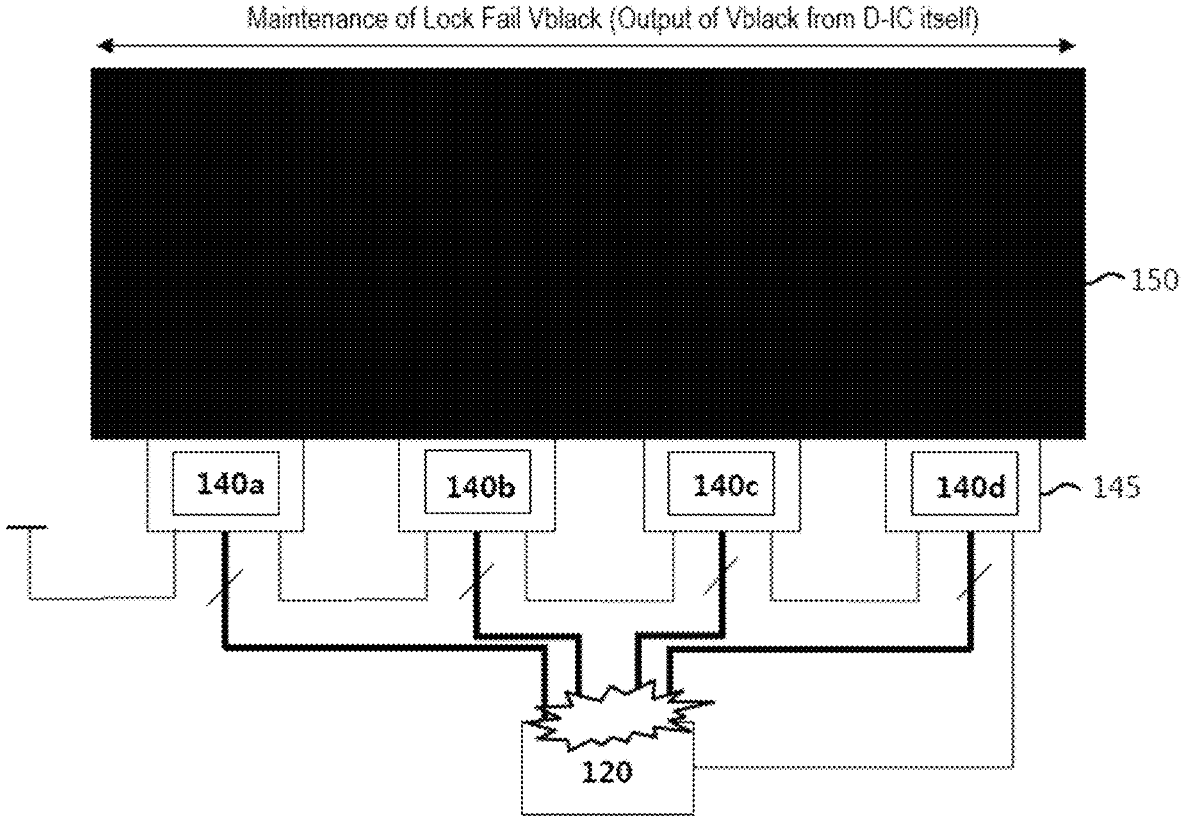

FIG. 17 is a diagram explaining operation states of the timing controllers and the data drivers according to the comparative example and the aspect of the present disclosure when abnormality of power is generated. FIGS. 18 and 19 are diagrams showing states of display panels, for better understanding of FIG. 17.

Referring to a normal operation state Normal shown in FIG. 17, when power TCPWR input to the timing controller dips, the data driver of the comparative example may output an abnormal data voltage Abnormal Data throughout the entire period. However, the data driver of the aspect may recognize lock signal failure Lock Fail according to generation of an internal lock signal ILOCK of logic low L, and may then output a black-level voltage Vblack (or a data voltage corresponding to 0) by itself.

Referring to an abnormal operation state Abnormal shown in FIG. 17, the data driver of the comparative example may output an abnormal data voltage Abnormal Data in a certain period (comparative example 1) or throughout the entire period (comparative example 2). Accordingly, when power TCPWR input to the timing controller 120 dips, as shown in FIG. 18, the first data driver 140*a* and the second data driver 140*b* of the comparative example may output an abnormal data voltage Abnormal Data in a certain period or throughout the entire period.

On the other hand, referring to the abnormal operation state Abnormal shown in FIG. 17, the data driver of the aspect may recognize lock signal failure Lock Fail according to generation of an internal lock signal ILOCK of logic low L, and may then output a black-level voltage Vblack (or a data voltage corresponding to 0) by itself. Accordingly, when the power TCPWR input to the timing controller 120 dips, as shown in FIG. 19, the first to fourth data drivers 140*a* to 140*d* of the aspect may output the black-level voltage Vblack (or the data voltage corresponding to 0) by themselves. As a result, the aspect may display a black image on sections of the display panel respectively controlled by the first to fourth data drivers 140*a* to 140*d*.

As described above, the comparative example continuously displays a high-luminance image because the data driver thereof is in an abnormal operation state and due to influence of a previous data voltage. For this reason, a problem according to an increase in temperature in the display panel (for example, a problem that a polarization plate of the display panel melts during a high-luminance operation) is generated. In the aspect, however, even when the data driver thereof is in an abnormal operation state, the data driver varies driving conditions by itself in order to output a black-level voltage for display of black on the display panel. Accordingly, the aspect may eliminate the problem that may occur in the comparative example.

As apparent from the above description, in accordance with the exemplary aspects of the present disclosure, there is an effect of enabling the data driver to vary driving conditions when the data driver is in an abnormal operation state, in order to output a voltage for display of black by itself, thereby minimizing occurrence of an abnormal phenomenon at the display panel. In addition, in accordance with the exemplary aspects of the present disclosure, since the data driver outputs a voltage for display of black by itself, when the data driver is in an abnormal operation state, it may be possible to not only prevent a problem caused by an increase in temperature in the display panel, but also to enhance driving stability.

The foregoing description and the accompanying drawings have been presented in order to illustratively explain technical ideas of the present disclosure. A person skilled in the art to which the present disclosure pertains can appreciate that diverse modifications and variations acquired by combining, dividing, substituting, or changing constituent elements may be possible without changing essential characteristics of the present disclosure. Therefore, the foregoing aspects disclosed herein shall be interpreted as illustrative only and not as limitative of the principle and scope of the present disclosure. It should be understood that the scope of the present disclosure shall be defined by the appended claims and all of equivalents thereto fall within the scope of the present disclosure.

What is claimed is:

1. A display device comprising:

a timing controller;

a data driver controlled by the timing controller; and a display panel configured to display an image by the data driver, wherein the data driver is configured to, when a clock signal included in a data signal provided to the data driver from the timing controller cannot be recovered by a clock recovery circuit of the data driver, generate a voltage for display of black and supply the voltage to the display panel.

2. The display device according to claim 1, wherein the data driver generates the voltage for display of black based on a logic state of an internal lock signal corresponding to recovery of the clock signal.

3. The display device according to claim 2, wherein the data driver generates the voltage for display of black when the internal lock signal transitions to logic low.

4. The display device according to claim 2, wherein the data driver comprises a multiplexer; and wherein the multiplexer uses a black voltage source as an output thereof based on the internal lock signal.

5. The display device according to claim 2, wherein the data driver comprises a latch configured to store a data signal transmitted from the timing controller; and wherein the latch resets the data signal, thereby outputting a data signal of 0.

6. The display device according to claim 1, wherein the data driver is configured to output a data voltage after outputting the voltage for display of black during a period in which a gate start pulse for control of start of a scan signal is generated at least two times.

7. A data driver comprising:

a recovery circuit configured to receive a signal including a clock signal and a data signal from a data packet input through an input terminal from a timing controller and to output an internal lock signal having a value associated with recovery of the clock signal; and a data converter configured to generate a voltage for display of black based on the value of the internal lock signal and to output the voltage for display of black.

8. The data driver according to claim 7, wherein the data converter comprises a multiplexer; and wherein the multiplexer uses a black voltage source as an output thereof based on the internal lock signal.

9. The data driver according to claim 7, wherein the data converter comprises a latch configured to store a data signal; and wherein the latch resets the data signal based on the internal lock signal, thereby outputting a data signal of 0.

10. The data driver according to claim 7, wherein the data converter is configured to generate the voltage for display of black when the internal lock signal transitions to logic low.

11. The data driver according to claim 1, wherein the data driver cannot recover the clock signal based on at least one of a temperature in the display panel and deterioration of driving stability.

12. The data driver according to claim 1, wherein the display of black reduces a power consumed in the display panel.

13. The data driver according to claim 1, wherein the data driver is further configured to:

transmit information to the timing controller indicating failure to recover the clock signal.

14. The data driver according to claim 1, wherein the data signal is provided to the data driver from an adjacent data driver.

15. The data driver according to claim 1, wherein the data driver is further configured to transmit the data signal to an adjacent data driver.

16. The data driver according to claim 7, wherein the internal lock signal indicates the clock signal cannot be recovered based on at least one of a temperature in a display panel and deterioration of driving stability.

17. The data driver according to claim 7, wherein the display of black reduces a power consumed in a display panel.

18. The data driver according to claim 7, wherein the data signal is provided to the data driver from an adjacent data driver.

19. The data driver according to claim 7, wherein the data driver is further configured to transmit the data signal to an adjacent data driver.

* * * * *